US012694611B2

(12) United States Patent
Atherton et al.

(10) Patent No.: US 12,694,611 B2
(45) Date of Patent: Jul. 28, 2026

(54) MACHINE LEARNING TECHNIQUES FOR SKETCH-TO-3D SHAPE GENERATION

(71) Applicant: AUTODESK, INC., San Francisco, CA (US)

(72) Inventors: Evan Patrick Atherton, Castro Valley, CA (US); Saeid Asgari Taghanaki, Burnaby (CA); Pradeep Kumar Jayaraman, Toronto (CA); Joseph George Lambourne, London (GB); Arianna Rampini, Ciampino (IT); Aditya Sanghi, Toronto (CA); Hooman Shayani, Longfield (GB)

(73) Assignee: AUTODESK, INC., San Francisco, CA (US)

( * ) Notice: Subject to any disclaimer, the term of this patent is extended or adjusted under 35 U.S.C. 154(b) by 155 days.

(21) Appl. No.: 18/488,383

(22) Filed: Oct. 17, 2023

(65) Prior Publication Data

US 2024/0331282 A1 Oct. 3, 2024

Related U.S. Application Data

(60) Provisional application No. 63/493,662, filed on Mar. 31, 2023.

(51) Int. Cl.
| | |
|---|---|
| *G06T 17/00* | (2006.01) |
| *G06T 7/543* | (2017.01) |
| *G06V 10/44* | (2022.01) |

(52) U.S. Cl.
CPC .............. *G06T 17/00* (2013.01); *G06T 7/543* (2017.01); *G06V 10/44* (2022.01)

(58) Field of Classification Search
None
See application file for complete search history.

(56) References Cited

U.S. PATENT DOCUMENTS

| | | | |
|---|---|---|---|
| 2014/0108016 A1* | 4/2014 | Albrecht .............. | G01C 21/367 704/E11.001 |
| 2022/0180602 A1* | 6/2022 | Hao ..................... | G06V 20/647 |
| 2023/0215093 A1* | 7/2023 | Yun .......................... | G06N 3/08 345/418 |

OTHER PUBLICATIONS

Extended European Search Report for Application No. 24167104.9 dated Aug. 9, 2024.
Wang et al., "Unsupervised Learning of 3D Model Reconstruction from Hand-Drawn Sketches", ACM Multimedia Conference, DOI: 10.1145/3240508.3240699, Oct. 22-26, 2018, pp. 1820-1828.

(Continued)

*Primary Examiner* — Jeffrey J Chow
(74) *Attorney, Agent, or Firm* — Artegis Law Group, LLP

(57) ABSTRACT

One embodiment of the present invention sets forth a technique for performing 3D shape generation. This technique includes generating semantic features associated with an input sketch. The technique also includes generating, using a generative machine learning model, a plurality of predicted shape embeddings from a set of fully masked shape embeddings based on the semantic features associated with the input sketch. The technique further includes converting the predicted shape embeddings into one or more 3D shapes. The input sketch may be a casual doodle, a professional illustration, or a 2D CAD software rendering. Each of the one or more 3D shapes may be a voxel representation, an implicit representation, or a 3D CAD software representation.

20 Claims, 6 Drawing Sheets

(56)     References Cited

OTHER PUBLICATIONS

Nozawa et al., "3D Car Shape Reconstruction from A Contour Sketch Using GAN And Lazy Learning", The Visual Computer, DOI: 10.1007/S00371-020-02024-Y, vol. 38, Apr. 16, 2021, pp. 1317-1330.

Nhuong et al., "3D Model Reconstruction Using Gan and 2.5D Sketches From 2D Image" DOI: 10.24036/tip.v1512, vol. 15, No. 2, Sep. 2022, pp. 1-10.

Kazi et al., "DreamSketch: Early Stage 3D Design Explorations with Sketching and Generative Design", Session: 3D Sketching, UIST, DOI: 10.1145/3126594.3126662, Oct. 22-25, 2017, pp. 401-414.

\* cited by examiner

Training Data
210

Reconstruction
Loss
270

Commitment
Loss
280

Encoding Network
230

Shape Embeddings
240

Decoding Network
250

Reconstructed
Shape
260

Machine Learning Model
220

MACHINE LEARNING TECHNIQUES FOR SKETCH-TO-3D SHAPE GENERATION

CROSS-REFERENCE TO RELATED APPLICATIONS

This application claims priority benefit of United States Patent Application titled "ZERO-SHOT SKETCH-TO-3D SHAPE GENERATION," Ser. No. 63/493,662, filed Mar. 31, 2023. The subject matter of this related application is hereby incorporated herein by reference.

BACKGROUND

Field of the Various Embodiments

Embodiments of the present disclosure relate generally to machine learning and computer vision and, more specifically, to machine learning techniques for sketch-to-3D shape generation.

Description of the Related Art

Sketch-to-3D shape generation refers to the creation of a three-dimensional (3D) model from an input sketch. A sketch is a two-dimensional (2D) representation of an object intended to convey semantic information, geometric relationships, and stylistic details about a 3D object. Sketches are a useful way to quickly convey information about an object without the sketch necessarily being detailed, complete, or dimensionally accurate. This generality allows virtually anyone to produce an informative sketch of a 3D object regardless of their artistic ability or their level of detailed knowledge about the object. Sketches do not require expertise with sophisticated 3D modeling software, although such software may be used to generate sketches as well.

Examples of sketches include simple doodles, professional drawings, and 2D renderings from computer-aided design (CAD) software programs. Each of these types of 2D sketches may convey information about a particular 3D object at a different level of abstraction. For instance, a child's abstract doodle of an airplane may simply depict the broad semantic features of an airplane such as a fuselage, wings, and a tail section. A professional illustrator's rendering of an airplane, while still somewhat abstract, may include finer details of various airplane components. A professional illustration may further employ shading, varying line widths, and the use of perspective to convey important geometric and stylistic details of an object. A 2D rendering from a CAD computer program represents the least amount of abstraction and may describe component geometry and dimensional relations between components to any desired level of precision.

Sketch-to-3D shape generation is a useful technique that works with sketches of varying levels of abstraction as described above. Sketch-to-3D shape generation techniques can capture the semantic essence of a child's drawing in a 3D model, while also being able to create 3D models that accurately depict 3D shapes depicted in professional illustrations or 2D CAD renderings. This flexibility makes 3D modeling more accessible to the general public while simultaneously allowing design professionals to easily and rapidly create virtual models that accurately reflect the shape, size, and characteristics of real-world objects and environments.

Existing Sketch-to-3D techniques can utilize deep supervised learning techniques to generate 3D shapes from sketches. However, existing techniques suffer from a lack of large scale (sketch, 3D shape) paired training data. As a result, existing learning techniques are either trained on synthetic datasets or data collected from only a few categories of 3D shapes. Even when a small number of categories of paired sketch-shape data has been collected, current techniques fail to generalize to different levels of abstraction in sketches ranging from casual doodles to detailed professional drawings. Further, existing techniques often exhibit strong inductive biases inherited from the training data such as view angle and depth information, thereby constraining their generalizability across 3D representations.

As the foregoing illustrates, what is needed in the art are more effective techniques for performing sketch-to-3D shape generation.

SUMMARY

One embodiment of the present invention sets forth a technique for performing 3D shape generation. The technique includes generating semantic features associated with an input sketch. The technique also includes generating, using a generative machine learning model, a plurality of predicted shape embeddings from a set of fully masked shape embeddings based on the semantic features associated with the input sketch. The technique further includes converting the predicted shape embeddings into one or more 3D shapes.

One technical advantage of the disclosed technique relative to the prior art is that the disclosed technique leverages prior knowledge encoded in large pre-trained image-text models. The availability of large amounts of (image, text) paired training data obviates the need for large-scale (sketch, 3D shape) paired training data. Rather than relying on a model to directly relate sketches to 3D shapes, the present technique utilizes a large, pre-trained, image-text model to extract semantically robust features from an input sketch. The pre-trained model effectively extracts semantic features from input sketches of varying levels of complexity. The disclosed technique then uses these extracted semantic features to guide a generative machine learning model to produce a 3D shape reflecting the semantic features extracted from the input sketch. The disclosed technique therefore generates 3D shapes from sketches without the need for (sketch, 3D shape) paired training data. The technique generalizes over varying levels of complexity in the input sketch and provides "zero-shot" shape generation where the technique can generate a 3D shape from a sketch with no prior knowledge or specific training regarding the category of object depicted in the input sketch. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
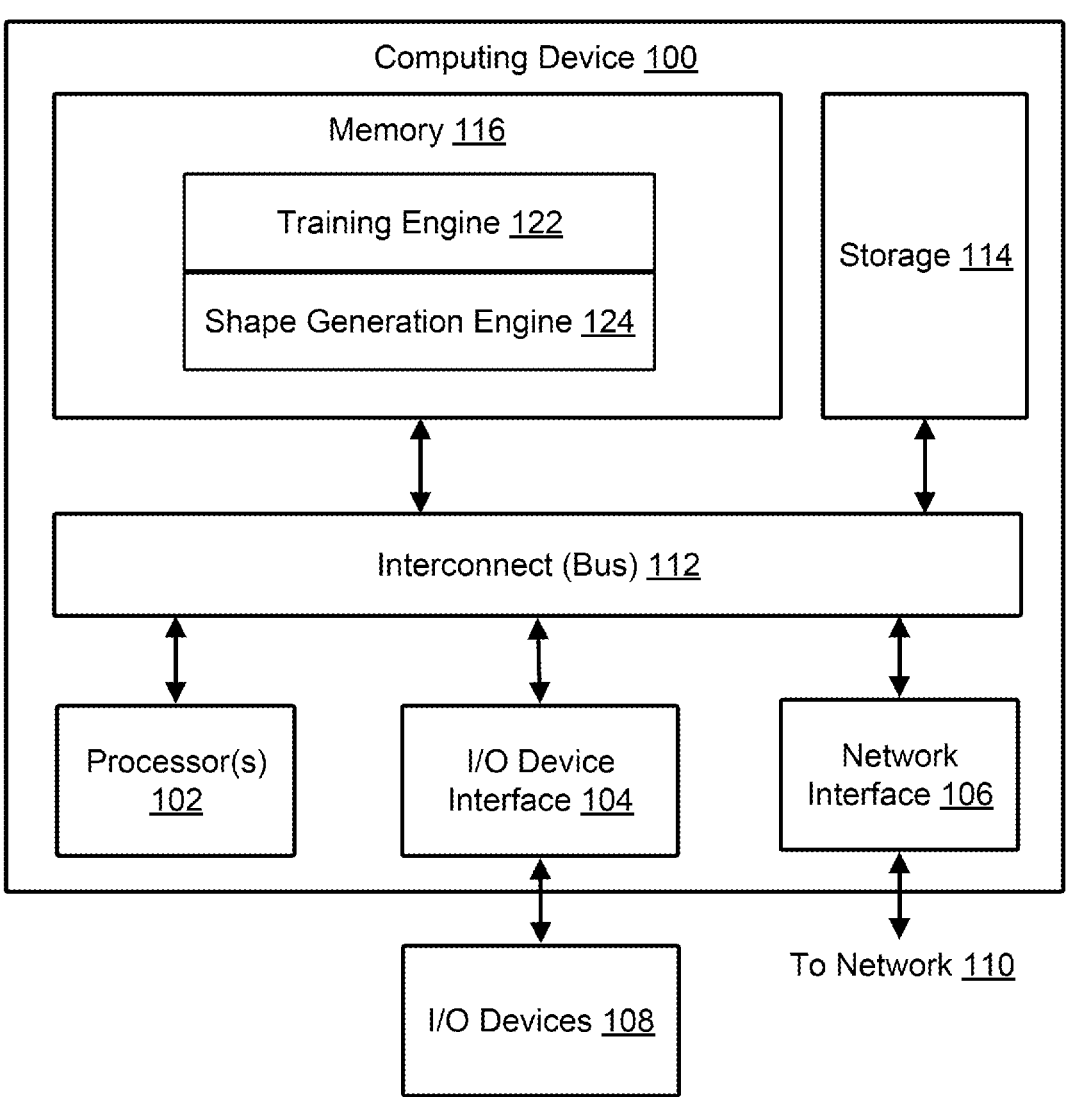
FIG. 1 illustrates a computing device 100 configured to implement one or more aspects of various embodiments.

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and a shape generation engine 124 that reside in a memory 116.

It is noted that the computing device described herein is illustrative and that any other technically feasible configurations fall within the scope of the present disclosure. For example, multiple instances of training engine 122 and shape generation engine 124 could execute on a set of nodes in a distributed and/or cloud computing system to implement the functionality of computing device 100. In another example, training engine 122 and/or shape generation engine 124 could execute on various sets of hardware, types of devices, or environments to adapt training engine 122 and/or shape generation engine 124 to different use cases or applications. In a third example, training engine 122 and shape generation engine 124 could execute on different computing devices and/or different sets of computing devices.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Training engine 122 and shape generation engine 124 may be stored in storage 114 and loaded into memory 116 when executed.

Memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and shape generation engine 124.

In some embodiments, training engine 122 trains one or more machine learning models to perform 3D shape generation. In 3D shape generation, the contents of a 2D input sketch inform and guide the generation of a corresponding 3D output shape. Shape generation engine 124 executes machine learning model(s) to generate a 3D output shape from an input sketch.

More specifically, training engine 122 and shape generation engine 124 are configured to train and execute one or more machine learning models that perform 3D shape generation from a 2D input sketch. The complexity of the input sketch may vary from a casual doodle to a professional illustration or a 2D Computer Aided Design (CAD) software rendering. The 3D output shape may be a voxel representation of a 3D object, an implicit representation, or a 3D CAD software representation.

Three-Dimensional Shape Generation

Figure 2:
FIG. 2 is a more detailed illustration of training engine 122 of FIG. 1, according to some embodiments.

FIG. 2 is a more detailed illustration of training engine 122 of FIG. 1, according to some embodiments. Training engine 122 trains a machine learning model 220 that encodes and subsequently decodes a 3D input shape to produce a 3D reconstructed shape 260. As shown, training engine 122 includes a machine learning model 220 and training data 210. Training engine 122 trains the machine learning model 220 such that the decoded 3D reconstructed shape 260 is an accurate reconstruction of the 3D input shape from training data 210. During training, the accuracy of reconstructed shape 260 is evaluated using a reconstruction loss that quantifies differences between the 3D input shape and reconstructed shape 260.

Training data 210 includes 3D representations of various objects. In various embodiments, the training data 210 includes 3D shapes, each denoted by S. Each 3D shape can be represented as a voxel grid, an implicit (e.g. occupancy) representation, or a CAD representation.

Machine learning model 220 includes an encoder network 230 that compresses the shape distributions of 3D shapes in training data 210 into a compressed sequence of discrete indices (shape embeddings 240). In various embodiments, encoder network 230 is a Vector Quantized Variational Auto-encoder (VQ-VAE). A VQ-VAE efficiently models the 3D shape in a compressed latent space represented by shape embeddings 240, circumventing posterior collapse and enabling the subsequent generation of high-quality 3D shapes. Encoding network 230 transforms each 3D shape S in training data 210 using an encoder $E(\cdot)$ into a sequence of discrete indices Z (shape embeddings 240), the indices pointing to a shape dictionary, shown as Z=VQ(E(S)).

Machine learning model 220 includes a decoding network 250 to decode the shape embeddings 240 (discrete indices Z) generated by encoding network 230 into a 3D reconstructed shape 260 (S'), shown as S'=D(Z).

Training engine 122 adjusts the parameters of machine learning model 220 based on reconstruction loss 270 and commitment loss 280. Reconstruction loss 270 represents the differences between a shape S from training data 210 and the corresponding reconstructed shape 260 (S'), shown as $L_{rec}(S,S')$. Commitment loss 280 encourages the encoder $E(\cdot)$ of encoding network 230 to commit to an embedding in the shape dictionary. Training engine 122 further applies an exponential moving average strategy in encoding network 230. This strategy encourages shape dictionary entries to gradually be pulled toward the encoded features of shape S from the training data 210.

Figure 3:
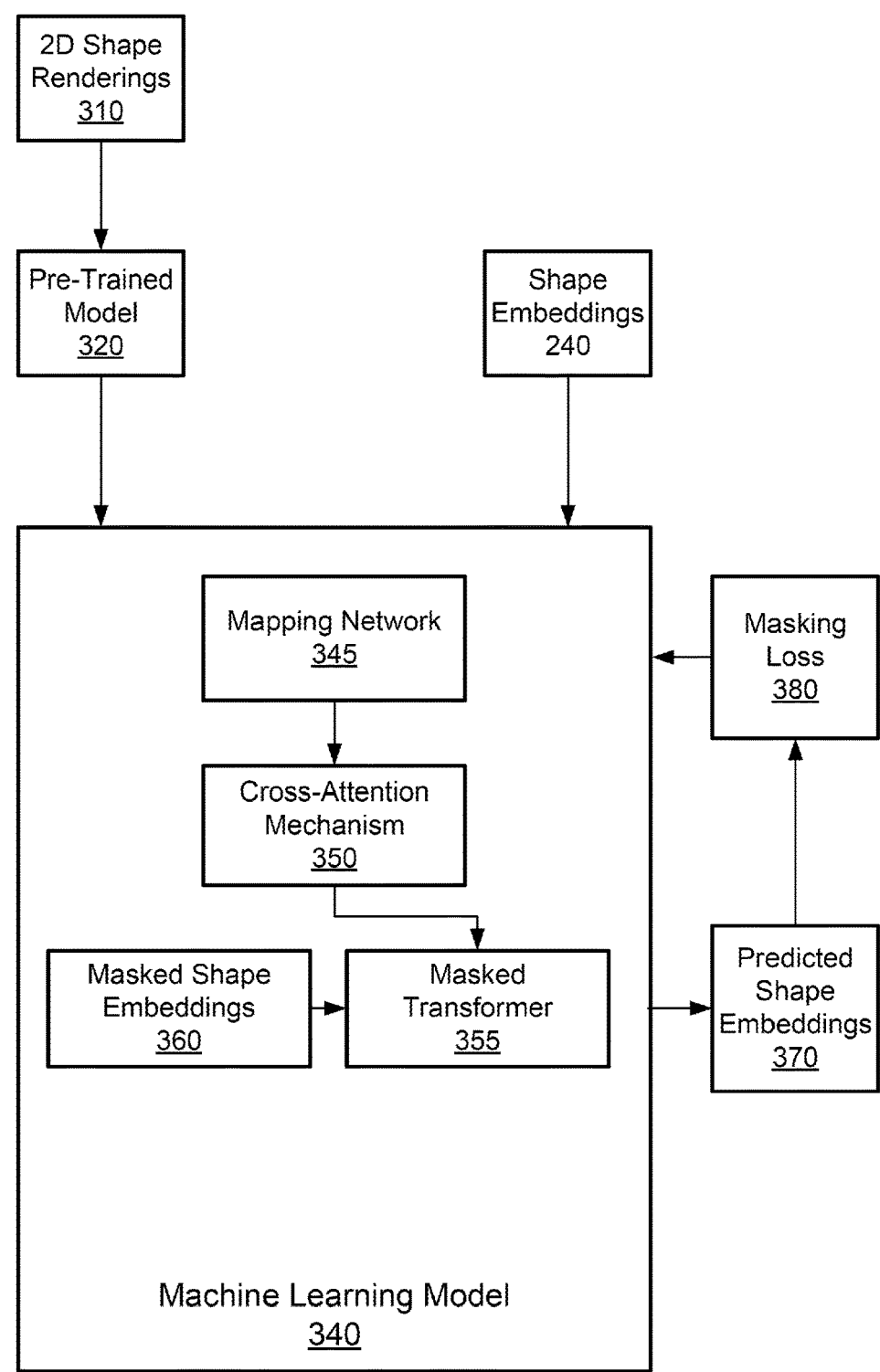
FIG. 3 is a more detailed illustration of training engine 122 of FIG. 1, according to some embodiments.

FIG. 3 is a more detailed illustration of training engine 122 of FIG. 1, according to some embodiments. Training engine 122 trains a machine learning model 340 to generate predicted shape embeddings 370 based on input shape embeddings 330 and input 2D shape renderings 310. As shown, training engine 122 includes a machine learning model 340, shape embeddings 240, 2D shape renderings 310 and pre-trained model 320. Pre-trained model 320 generates semantic features from 2D shape renderings 310, and machine learning model 340 generates predicted shape embeddings 370. Training engine 122 applies the semantic features extracted from 2D shape renderings 310 by pre-trained model 320 to machine learning model 340. These semantic features guide and inform machine learning model 340 through a cross-attention mechanism, such that machine learning model 340 is conditioned on the semantic features of 2D shape renderings 310.

Machine learning model 340 processes shape embeddings 240 and the output from pre-trained model 320. Shape embeddings 240 are the shape embeddings Z generated for each 3D shape S in training data 210, as described above in reference to FIG. 2. Pre-trained model 320 is a locked, pre-trained machine learning model trained on a dataset of 2D images and text snippets associated with the images. A "locked" model is a model for which any learnable parameters have previously been trained, such that the model's parameters remain unchanged during post-training execution of the model. Pre-trained model 320 analyzes 2D shape renderings 310 and generates semantic features associated with the 2D rendering. 2D shape renderings 310 are two-dimensional, multi-view depictions of the 3D shapes contained in training data 210, described above in reference to FIG. 2. For each 3D shape in training data 210, training engine 122 generates r multi-view synthetic renderings (2D shape renderings 310), denoted as $I^{1:r}$, and pre-trained model 320 generates semantic features associated with each of 2D shape renderings 310.

Training engine 122 includes machine learning model 340. In various embodiments, machine learning model 340 is a conditional generative model, such as a bidirectional transformer-based network. Machine learning model 340 transforms shape embeddings 240 conditioned on the semantic features from pre-trained model 320 to generate predicted shape embeddings 370. During training, training engine 122 randomly selects a fraction of shape embeddings 240 to be "masked" to produce $Z^{msk}$ (masked shape embeddings 360). Each of the masked shape embeddings are annotated with a "mask token", while shape embeddings without a mask token are said to be "unmasked." Training engine 122 trains machine learning model 340 by iteratively unmasking the masked shape embeddings 360 based on the conditional semantic features from pre-trained model 320. The training objective is to minimize the masking loss $L_{mask}$, given by:

$$L_{mask} = -E_{Z,C \in D}[\log p(Z|Z^{msk},C)],$$

where C represents the conditional information from a given shape S generated by pre-trained model 320 from the multi-view 2D shape renderings 310./.

At each iteration of training, training engine 122 randomly, or otherwise, selects one view of the $I^{1:r}$ multi-view synthetic renderings for the given shape S as the 2D shape rendering 310. Pre-trained model 320 generates a textual semantic feature grid for the 2D shape rendering. Training engine 122 may select the textual semantic feature grid from one of various layers of pre-trained model 320. In some embodiments, the textual semantic feature grid may be selected from a layer other than the last layer of the pre-trained model 320, such as the penultimate layer. Mapping network 345 of machine learning model 340 comprises several Multilayer Perceptron (MLP) layers and converts the textual semantic feature grid into a sequence of features.

Cross-attention mechanism 350 applies the sequence of features to the masked transformer 355. Masked transformer 355 unmasks the masked shape embeddings 360 conditioned on the textual semantic feature grid from mapping network 345 applied through cross-attention mechanism 350. Masked transformer 355 then generates predicted shape embeddings 370. Training engine 122 then calculates $L_{mask}$ based on predicted shape embeddings 370 and shape embeddings 240. Training engine 122 updates the parameters of machine learning model 340 and optionally begins the next training iteration by randomly selecting a new 2D shape rendering 310 and randomly masking a fraction of shape embeddings 240 to generate a new masked shape embeddings 360.

Figure 4:
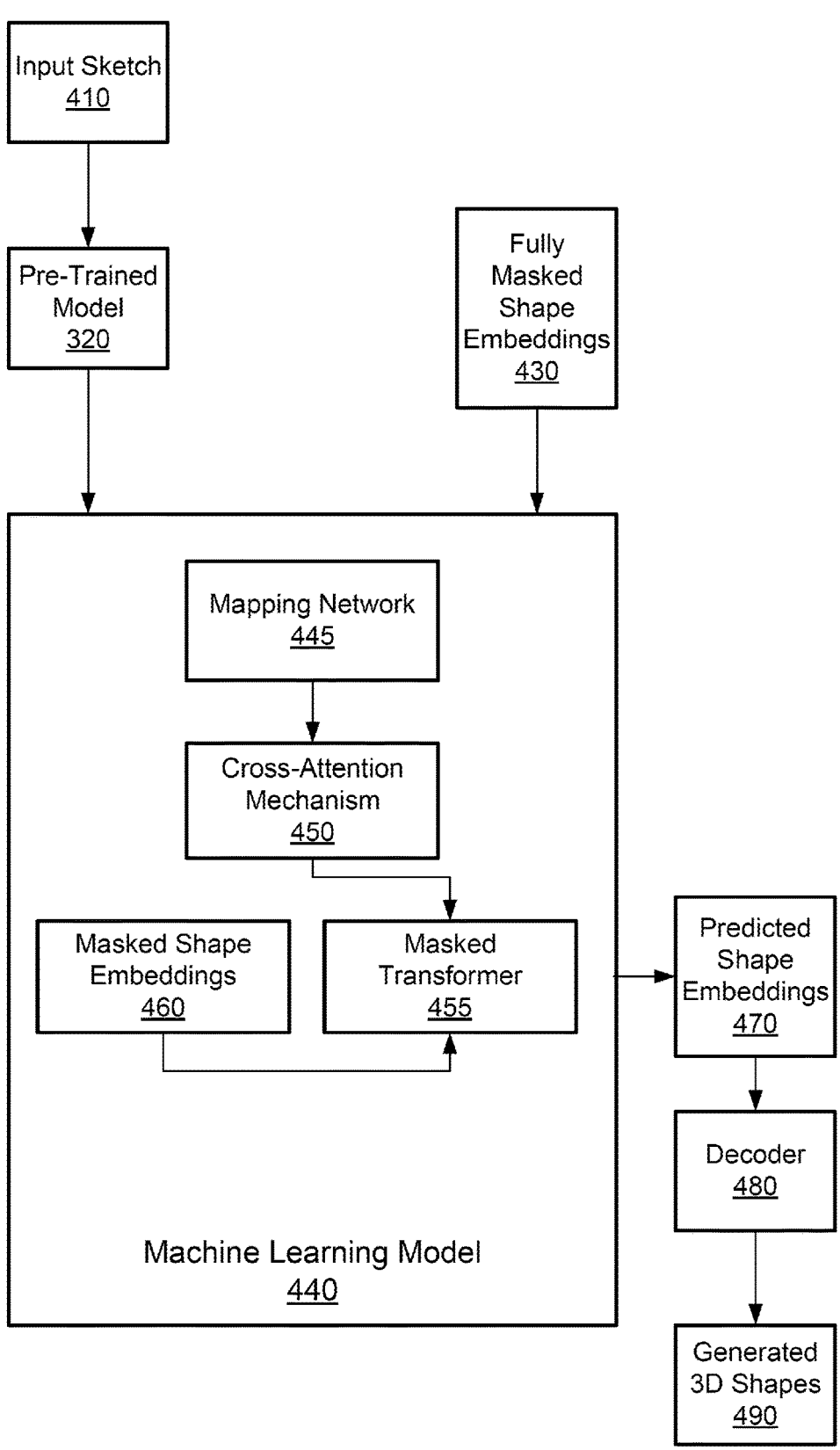
FIG. 4 is a more detailed illustration of shape generation engine 124 of FIG. 1, according to some embodiments.

FIG. 4 is a more detailed illustration of shape generation engine 124 of FIG. 1, according to some embodiments. Shape generation engine 124 generates one or more 3D shapes 490 based on an input sketch 410 and fully masked shape embeddings 430. As shown, shape generation engine 124 further contains pre-trained model 320 and machine learning model 440. Pre-trained model 320 generates semantic features from input sketch 410, and machine learning model 440 generates predicted shape embeddings 470. Shape generation engine 124 applies the semantic features extracted from input sketch 410 by pre-trained model 320 to machine learning model 440. These semantic features guide and inform machine learning model 440 through a cross-attention mechanism, such that shape generation engine 124 conditions machine learning model 440 on the semantic features of input sketch 410. Shape generation engine 124 further includes decoder 480 that decodes predicted shape embeddings 470 to produce generated 3D shapes 490.

Machine learning network 440 processes fully masked shape embeddings 430 and the output from pre-trained model 320. Fully masked shape embeddings 430 are the shape embeddings Z generated for each 3D shape S in training data 210, as described above in reference to FIG. 2. Initially, each of the shape embeddings is annotated with a mask token as described above in reference to FIG. 3, resulting in "fully masked" shape embeddings 430. Pre-trained model 320 is the same locked, pre-trained model described above in reference to FIG. 3.

Input sketch 410 is a two-dimensional representation of an object. In various embodiments, input sketch 410 may be a casual doodle, a professional illustration or a 2D CAD rendering. Pre-trained model 320 analyzes input sketch 410 and generates a textual semantic feature grid associated with input sketch 410. Shape generation engine 124 may select the textual semantic feature grid from one of various layers of pre-trained model 320. In some embodiments, the textual semantic feature grid may be selected from a layer other than the last layer of the pre-trained model 320, such as the penultimate layer.

Mapping network 445 of machine learning model 440 comprises several Multilayer Perceptron (MLP) layers and converts the textual semantic feature grid from pre-trained model 320 into a sequence of features. Shape generation engine 124 applies this sequence of features to the masked transformer 455 through cross-attention mechanism 450.

Masked shape embeddings 460 initially comprise the fully masked shape embeddings 430. Masked transformer 455 iteratively unmasks the masked shape embeddings 460 based on the conditional semantic information generated by pre-trained model 320 and applied to masked transformer 455 via mapping network 445 and cross-attention mechanism 450. During each iteration, masked transformer 455 predicts a completely unmasked set of shape embeddings, of which a specific fraction of the highest confidence masked tokens is accepted. These selected tokens are designated as unmasked for the remaining steps. The rest of the tokens are reset to masked, except for the already unmasked tokens from the previous steps. This iterative process continues until all the tokens are unmasked. In various embodiments, masked transformer 455 iteratively unmasks the tokens in masked shape embeddings 460 using a cosine schedule, such that the fraction of tokens selected to be unmasked in each successive iteration increases exponentially.

After all the tokens in masked shape embeddings 460 have been unmasked, masked transformer 455 generates predicted shape embeddings 470. Decoder 480 decodes predicted shape embeddings 470 into generated 3D shapes 490. Decoder 480 is previously trained as part of decoding network 250 described above in reference to FIG. 2. In various embodiments, generated 3D shapes 490 may comprise voxel representations, implicit representations, or 3D CAD representations.

Figure 5:
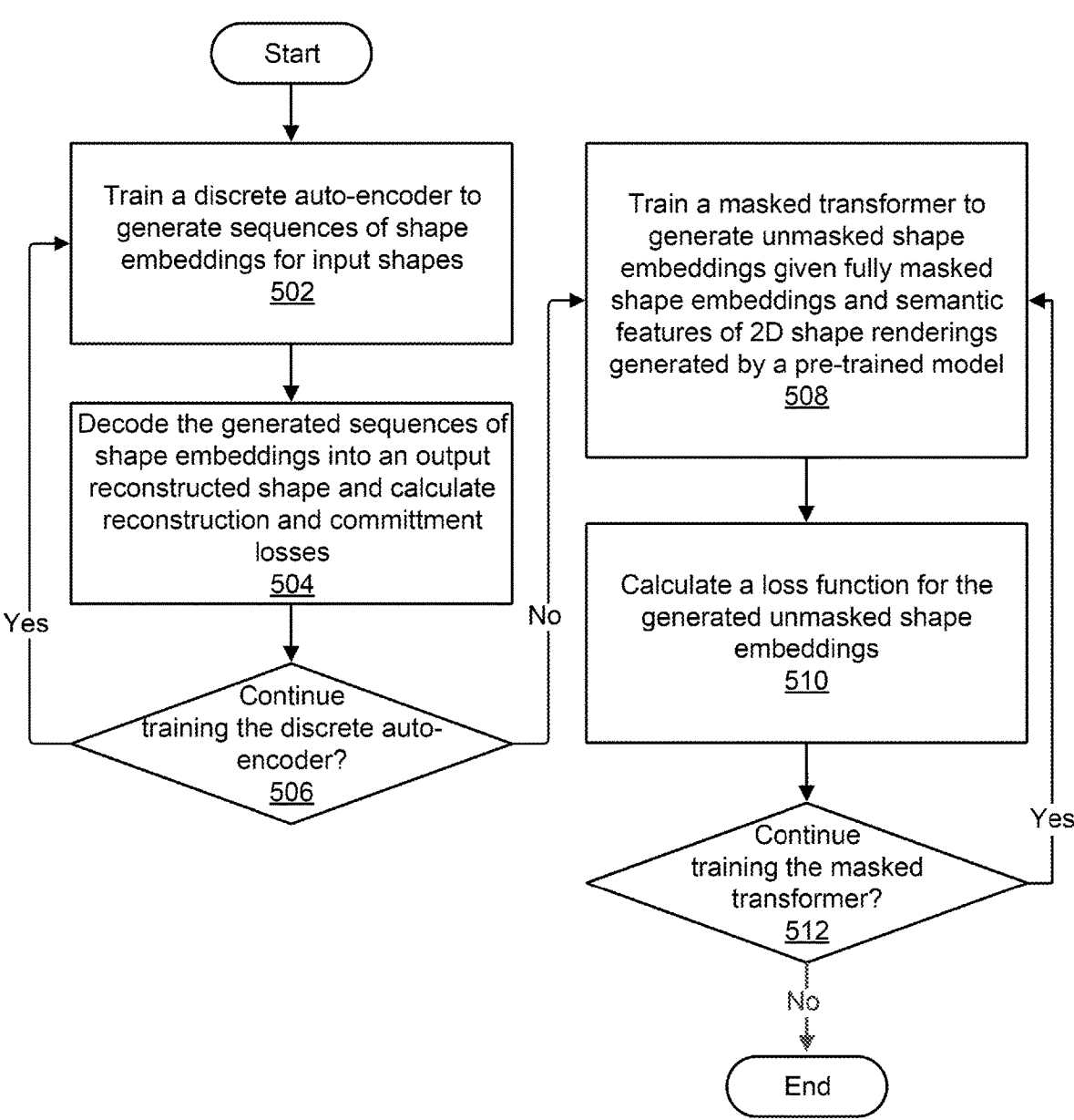
FIG. 5 is a flow diagram of method steps for training a machine learning model to perform 3D shape generation from an input sketch, according to various embodiments.

FIG. 5 is a flow diagram of method steps for training a machine learning model to perform 3D shape generation from an input sketch, according to various embodiments. Although the method steps are described in conjunction with the systems of FIGS. 1-4, persons skilled in the art will understand that any system configured to perform the method steps in any order falls within the scope of the present disclosure.

As shown, in operation 502, training engine 122 executes a discrete auto-encoder to generate a sequence of shape embeddings for a training set of 3D input shapes. In various embodiments, the discrete auto-encoder is a Vector Quantized Variational Auto-encoder (VQ-VAE). For each 3D shape in the training set, the discrete auto-encoder transforms the 3D shape into a sequence of shape embeddings. The shape embeddings are indices pointing to a shape dictionary.

In operation 504, training engine 122 decodes the generated sequence of shape embeddings into an output reconstructed shape. For each output reconstructed shape, training engine 122 calculates a reconstruction loss that quantifies differences between the 3D input shape and reconstructed shape. Training engine 122 further calculates a commitment loss to encourage the discrete auto-encoder to commit to entries in the shape dictionary. Training engine 122 also applies an exponential moving average strategy to the auto-encoder. This strategy encourages shape dictionary entries to gradually be pulled toward the encoded features of the 3D shape from the training data set. In operation 506, training engine 122 compares the calculated reconstruction loss to a predetermined threshold. If the reconstruction loss is greater than the predetermined threshold, training engine 122 continues training the discrete auto-encoder. If the reconstruction loss is less than the predetermined threshold, training engine 122 discontinues training the discrete auto-encoder.

In operation 508, training engine 122 trains a masked transformer to generate unmasked shape embeddings from partially masked shape embeddings and semantic features extracted from 2D shape renderings. The 2D shape renderings comprise multi-view image renderings of the 3D shapes in training data set. Training engine 122 selects a 3D shape from the training data set and randomly selects one of the 2D shape renderings from the associated multi-view 2D shape renderings of the 3D shape.

Training engine 122 applies a locked, pre-trained model to the randomly selected 2D shape rendering. The model is pre-trained on a dataset of (image, text) paired data, and generates a grid of semantic features for the selected 2D shape rendering. The grid of semantic features is converted into a sequence of features by a mapping network and is applied to a generative masked transformer via a cross-attention mechanism. In this manner, training engine 122 conditions the masked transformer on the semantic features of the 2D shape rendering.

At each training iteration, training engine 122 randomly masks a fraction of the shape embeddings generated in operation 502. Each of the masked shape embeddings are annotated with a "mask token," while shape embeddings without a mask token are said to be "unmasked." The masked transformer unmasks the masked shape embeddings conditioned on the semantic features and generates a predicted shape embedding.

In operation 510, training engine 122 compares the unmasked predicted shape embedding to the shape embedding generated in operation 502 and calculates a masking loss. The masking loss quantifies how accurately the masked transformer duplicated the 3S object's shape embedding given the partially masked shape embedding and the conditional semantic features from the pre-trained model. The training objective is to minimize the masking loss.

In operation 512, training engine 122 determines whether the masking loss has been minimized, achieving the training objective. If the training objective has not been met, training engine 122 continues training the masked transformer. If the training objective has been met, training engine 122 discontinues training.

Figure 6:
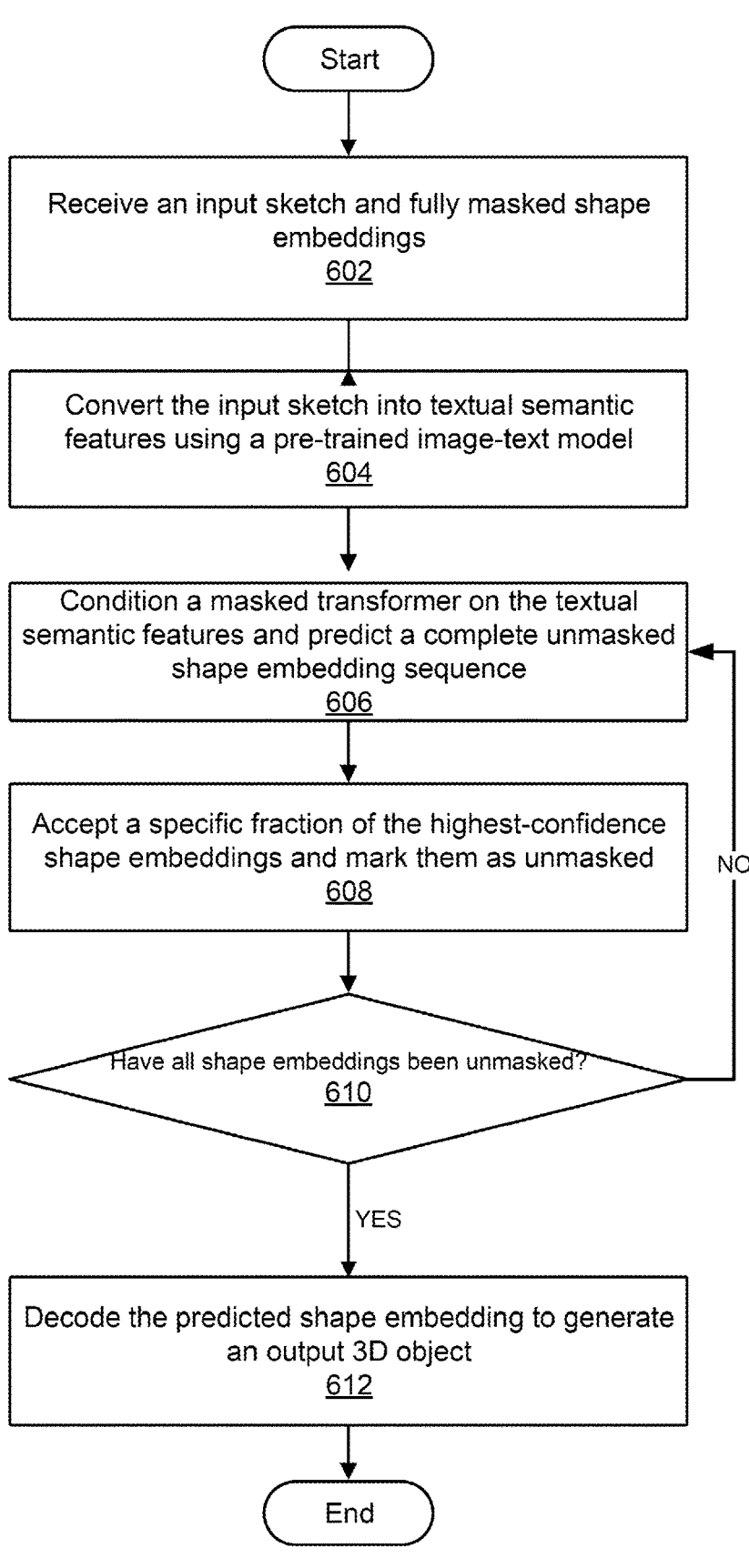
FIG. 6 is a flow diagram of method steps for generating a 3D shape from an input sketch, according to various embodiments.

FIG. 6 is a flow diagram of method steps for generating a 3D shape from an input sketch, according to various embodiments. Although the method steps are described in conjunction with the systems of FIGS. 1-4, persons skilled in the art will understand that any system configured to perform the method steps in any order falls within the scope of the present disclosure.

As shown, in operation 602, shape generation engine 124 processes an input sketch and fully masked shape embeddings. In various embodiments, the input sketch may be a casual doodle, a professional illustration, or a 2D CAD software rendering. The fully masked shape embeddings are shape embeddings generated during training as described above in reference to FIG. 2. Each of the shape embeddings is initially annotated with a mask token, yielding fully masked shape embeddings.

In operation 604, shape generation engine 124 converts the input sketch into semantic features. Shape generation engine applies a locked, pre-trained model that has been trained on a dataset of (image, text) pairs. The pre-trained model generates a grid of semantic features from the input sketch. Shape generation engine 124 applies this grid of semantic features to a mapping network that converts the grid of semantic features into a sequence of semantic features.

In operation 606, shape generation engine 124 conditions a masked transformer on the sequence of semantic features via a cross-attention network. The masked transformer predicts a complete unmasked shape embedding sequence from the fully masked shape embeddings. In operation 608, shape generation engine 124 selects a specific fraction of the highest confidence masked shape embeddings and designates those embeddings as unmasked for the remaining steps. The rest of the embeddings are reset to masked, except for the already unmasked embeddings from previous steps. In some embodiments, the specific fraction of highest confidence masked shape embeddings selected during each iteration is determined according to a cosine schedule. According to the cosine schedule, the selected fraction of highest confidence masked shape embeddings increases exponentially with each subsequent iteration.

In operation 610, shape generation engine 124 determines whether all the initially masked shape embeddings have been unmasked. If all the shape embeddings have been unmasked, the iterative process terminates. If masked shape embeddings remain, shape generation engine 124 continues with the next iteration of the unmasking process.

In operation 612, shape generation engine 124 applies a decoder to convert the predicted shape embeddings from the final iteration of the unmasking process into a 3D shape. The decoder has previously been trained as described above in reference to FIG. 2. In various embodiments, the decoded 3D shape may be a voxel representation, an implicit representation, or a 3D CAD software representation.

In sum, the disclosed techniques train and execute a machine learning model to process a 2D input sketch and generate a corresponding 3D output shape. The machine learning model accepts input sketches of varying complexity, from casual doodles to professional illustrations and 2D CAD software renderings.

The machine learning model includes a discrete encoder that converts a library of 3D shapes into shape embeddings in the form of discrete indices pointing to a shape dictionary.

The machine learning model also includes one or more decoders that convert the shape embeddings back into 3D shapes. The encoder and decoder(s) are trained on a 3D shape library and can encode and decode 3d shapes expressed as voxel, implicit, or CAD representations.

The machine learning model also includes a semantic model that is pre-trained on (image, text) paired training data and then frozen. The pre-trained semantic model extracts semantic features from an input image. The machine learning model also includes a masked transformer as a conditional generative model. The masked transformer is trained to generate 3D shapes given shape embeddings from the encoder and semantic features generated from input images by the pre-trained semantic model. At each iteration of training, a portion of the shape embeddings from the encoder are masked, and the pre-trained semantic model converts an image representing a 2D rendering of a 3D object from the library of 3D shapes into semantic features. The training objective is to fully unmask the masked shape embeddings using the provided semantic features to condition the transformer.

At inference time, the shape embeddings are initially fully masked, and the pre-trained semantic model extracts semantic features from an input sketch. These extracted semantic features condition the masked transformer via a cross-attention mechanism. The process begins with the completely masked set of shape embeddings that are gradually unmasked using the conditional information provided by the local semantic features from the sketch. At each time step, the transformer predicts the complete unmasked shape embeddings and predicts confidence values for the unmasked shape embeddings. A specific fraction of the embeddings with the highest confidence values are accepted and designated as unmasked for the remaining steps. The remaining embeddings are reset to masked except for already-unmasked embeddings from prior time steps. This iterative process continues until all of the embeddings are unmasked. The trained decoder then converts the unmasked shape embeddings into a generated 3D shape as the output from the machine learning model.

One technical advantage of the disclosed technique relative to the prior art is that the disclosed technique leverages prior knowledge encoded in large pre-trained image-text models. The availability of large amounts of (image, text) paired training data obviates the need for large-scale (sketch, 3D shape) paired training data. Rather than relying on a model to directly relate sketches to 3D shapes, the present technique utilizes a large, pre-trained, image-text model to extract semantically robust features from an input sketch. The pre-trained model effectively extracts semantic features from input sketches of varying levels of complexity. The disclosed technique then uses these extracted semantic features to guide a generative machine learning model to produce a 3D shape reflecting the semantic features extracted from the input sketch. The disclosed technique therefore generates 3D shapes from sketches without the need for (sketch, 3D shape) paired training data. The technique generalizes over varying levels of complexity in the input sketch and provides "zero-shot" shape generation, where the technique can generate a 3D shape from a sketch with no prior knowledge or specific training regarding the category of object depicted in the input sketch. These technical advantages provide one or more technological improvements over prior art approaches.

1. In various embodiments, a computer-implemented method comprises generating semantic features associated with an input sketch, generating, using a generative machine learning model, a plurality of predicted shape embeddings from a set of fully masked shape embeddings based on the semantic features associated with the input sketch and converting the predicted shape embeddings into one or more 3D shapes.

2. The computer-implemented method of clause 1, wherein the semantic features are generated using a trained machine learning model trained on a dataset of two-dimensional (2D) images and text snippets associated with the images.

3. The computer-implemented method of clauses 1 or 2, wherein the generative machine learning model comprises a masked transformer model, and further comprises converting the generated semantic features into a sequence of semantic features and applying the sequence of semantic features to the masked transformer model to guide the masked transformer model.

4. The computer-implemented method of any of clauses 1-3, further comprising iteratively unmasking, using the masked transformer model, the set of fully masked shape embeddings to form a set of shape embeddings, wherein, during each iteration, the masked transformer model unmasks a portion of the set of shape embeddings based on the sequence of semantic features applied to the masked transformer model and generating, once the set of shape embeddings has been unmasked, the predicted shape embeddings based on the set of shape embeddings.

5. The computer-implemented method of any of clauses 1-4, wherein iteratively unmasking comprises, during each iteration, predicting a complete unmasked shape sequence based on the unmasked portion of the set of shape embeddings, designating a specific portion of the complete unmasked shape sequence as unmasked for the remaining iterations based on the complete unmasked shape sequence, and designating a remaining portion of the set of shape embeddings as masked except for the unmasked portion of the set of shape embeddings from previous iterations.

6. The computer-implemented method of any of clauses 1-5, wherein the designation of a specific fraction of the unmasked shape sequence as unmasked for the remaining iterations is based on one or more confidence values calculated for each shape embedding in the complete unmasked shape sequence.

7. The computer-implemented method of any of clauses 1-6, wherein the input sketch comprises one of a casual doodle, a professional illustration, or a two-dimensional (2D) computer-aided design (CAD) software rendering.

8. The computer-implemented method of any of clauses 1-7, wherein each of the one or more 3D shapes comprises at least one of a voxel representation, an implicit representation, or a 3D computer-aided design (CAD) software representation.

9. The computer-implemented method of any of clauses 1-8, wherein converting the predicted shape embeddings into one or more 3D shapes is performed by a decoder that has been trained on a dataset of 3D shapes.

10. In various embodiments, one or more non-transitory computer-readable media store instructions that, when executed by one or more processors, cause the one or more processors to perform the steps of generating semantic features associated with an input sketch, generating, using a generative machine learning model, a plurality of predicted shape embeddings from a set of fully masked shape embeddings based on the semantic features associated with the input sketch, and converting the predicted shape embeddings into one or more 3D shapes.

11. The one or more non-transitory computer-readable media of clause 10, wherein the semantic features are generated using a trained machine learning model trained on a dataset of two-dimensional (2D) images and text snippets associated with the images.

12. The one or more non-transitory computer-readable media of clauses 10 or 11, wherein the generative machine learning model comprises a masked transformer model, and the instructions further causing the one or more processors to perform the steps of converting the generated semantic features into a sequence of semantic features and applying the sequence of semantic features to the masked transformer model to guide the masked transformer model.

13. The one or more non-transitory computer-readable media of any of clauses 10-12, the instructions further causing the one or more processors to perform the steps of iteratively unmasking, using the masked transformer model, the set of fully masked shape embeddings to form a set of shape embeddings, wherein, during each iteration, the masked transformer model unmasks a portion of the set of shape embeddings based on the sequence of semantic features applied to the masked transformer model, and generating, once the set of shape embeddings has been unmasked, the predicted shape embeddings based on the set of shape embeddings.

14. The one or more non-transitory computer-readable media of any of clauses 10-13, wherein iteratively unmasking comprises, during each iteration, predicting a complete unmasked shape sequence based on the unmasked portion of the set of shape embeddings, designating a specific portion of the complete unmasked shape sequence as unmasked for the remaining iterations based on the complete unmasked shape sequence, and designating a remaining portion of the set of shape embeddings as masked except for the unmasked shape embeddings from previous iterations.

15. The one or more non-transitory computer-readable media of any of clauses 10-14, wherein the designation of a specific fraction of the unmasked shape sequence as unmasked for the remaining iterations is based on one or more confidence values calculated for each shape embedding in the complete unmasked shape sequence.

16. The one or more non-transitory computer-readable media of any of clauses 10-15, wherein the input sketch comprises one of a casual doodle, a professional illustration, or a two-dimensional (2D) computer-aided design (CAD) software rendering.

17. The one or more non-transitory computer-readable media of any of clauses 10-16, wherein each of the one or more 3D shapes comprises at least one of a voxel representation, an implicit representation, or a 3D computer-aided design (CAD) software representation.

18. The one or more non-transitory computer-readable media of any of clauses 10-17, wherein converting the predicted shape embeddings into one or more 3D shapes is performed by a decoder that has been previously trained on a dataset of 3D shapes.

19. In various embodiments, a computer-implemented comprises generating a set of shape embeddings associated with a 3D object, generating semantic features associated with a two-dimensional (2D) rendering of the 3D object, generating a set of masked shape embeddings by randomly masking a portion of the set of shape embeddings, generating, using a generative machine learning model, a plurality of predicted shape embeddings based on the masked shape embeddings and the textual semantic features associated with the 2D rendering, and calculating a masking loss function based on the predicted shape embeddings, the set of shape embeddings associated with the 3D object, and the semantic features.

20. The computer-implemented method of clause 19, wherein the masking loss function $L_{mask}$ is expressed by $L_{mask} = -E_{Z,C \in D} [\log p(Z|Z^{msk}, C)]$, where E represents an expected value, Z represents the set of shape embeddings associated with the 3D object, $Z^{msk}$ represents the set of masked shape embeddings, and C represents the semantic features.

Any and all combinations of any of the claim elements recited in any of the claims and/or any elements described in this application, in any fashion, fall within the contemplated scope of the present invention and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing three-dimensional (3D) shape generation, the computer-implemented method comprising:
   generating semantic features associated with an input sketch;
   generating, using a generative machine learning model, a plurality of predicted shape embeddings from a set of fully masked shape embeddings based on the semantic features associated with the input sketch; and
   converting the predicted shape embeddings into one or more 3D shapes.

2. The computer-implemented method of claim 1, wherein the semantic features are generated using a trained machine learning model trained on a dataset of two-dimensional (2D) images and text snippets associated with the images.

3. The computer-implemented method of claim 2, wherein the generative machine learning model comprises a masked transformer model, and further comprising:
   converting the generated semantic features into a sequence of semantic features; and
   applying the sequence of semantic features to the masked transformer model to guide the masked transformer model.

4. The computer-implemented method of claim 3, further comprising:

iteratively unmasking, using the masked transformer model, the set of fully masked shape embeddings to form a set of shape embeddings, wherein, during each iteration, the masked transformer model unmasks a portion of the set of shape embeddings based on the sequence of semantic features applied to the masked transformer model; and generating, once the set of shape embeddings has been unmasked, the predicted shape embeddings based on the set of shape embeddings.

5. The computer-implemented method of claim 4, wherein iteratively unmasking comprises, during each iteration:

predicting a complete unmasked shape sequence based on the unmasked portion of the set of shape embeddings;

designating a specific portion of the complete unmasked shape sequence as unmasked for the remaining iterations based on the complete unmasked shape sequence; and designating a remaining portion of the set of shape embeddings as masked except for the unmasked portion of the set of shape embeddings from previous iterations.

6. The computer-implemented method of claim 5, wherein the designation of a specific portion of the unmasked shape sequence as unmasked for the remaining iterations is based on one or more confidence values calculated for each shape embedding in the complete unmasked shape sequence.

7. The computer-implemented method of claim 1, wherein the input sketch comprises one of a casual doodle, a professional illustration, or a two-dimensional (2D) computer-aided design (CAD) software rendering.

8. The computer-implemented method of claim 1, wherein each of the one or more 3D shapes comprises at least one of a voxel representation, an implicit representation, or a 3D computer-aided design (CAD) software representation.

9. The computer-implemented method of claim 1, wherein converting the predicted shape embeddings into one or more 3D shapes is performed by a decoder that has been trained on a dataset of 3D shapes.

10. One or more non-transitory computer-readable media storing instructions that, when executed by one or more processors, cause the one or more processors to perform the steps of:

generating semantic features associated with an input sketch;

generating, using a generative machine learning model, a plurality of predicted shape embeddings from a set of fully masked shape embeddings based on the semantic features associated with the input sketch; and converting the predicted shape embeddings into one or more 3D shapes.

11. The one or more non-transitory computer-readable media of claim 10, wherein the semantic features are generated using a trained machine learning model trained on a dataset of two-dimensional (2D) images and text snippets associated with the images.

12. The one or more non-transitory computer-readable media of claim 11, wherein the generative machine learning model comprises a masked transformer model, and the instructions further causing the one or more processors to perform the steps of:

converting the generated semantic features into a sequence of semantic features; and applying the sequence of semantic features to the masked transformer model to guide the masked transformer model.

13. The one or more non-transitory computer-readable media of claim 12, the instructions further causing the one or more processors to perform the steps of:

iteratively unmasking, using the masked transformer model, the set of fully masked shape embeddings to form a set of shape embeddings, wherein, during each iteration, the masked transformer model unmasks a portion of the set of shape embeddings based on the sequence of semantic features applied to the masked transformer model; and generating, once the set of shape embeddings has been unmasked, the predicted shape embeddings based on the set of shape embeddings.

14. The one or more non-transitory computer-readable media of claim 13, wherein iteratively unmasking comprises, during each iteration:

predicting a complete unmasked shape sequence based on the unmasked portion of the set of shape embeddings;

designating a specific portion of the complete unmasked shape sequence as unmasked for the remaining iterations based on the complete unmasked shape sequence; and designating a remaining portion of the set of shape embeddings as masked except for the unmasked shape embeddings from previous iterations.

15. The one or more non-transitory computer-readable media of claim 14, wherein the designation of a specific portion of the unmasked shape sequence as unmasked for the remaining iterations is based on one or more confidence values calculated for each shape embedding in the complete unmasked shape sequence.

16. The one or more non-transitory computer-readable media of claim 10, wherein the input sketch comprises one of a casual doodle, a professional illustration, or a two-dimensional (2D) computer-aided design (CAD) software rendering.

17. The one or more non-transitory computer-readable media of claim 10, wherein each of the one or more 3D shapes comprises at least one of a voxel representation, an implicit representation, or a 3D computer-aided design (CAD) software representation.

18. The one or more non-transitory computer-readable media of claim 10, wherein converting the predicted shape embeddings into one or more 3D shapes is performed by a decoder that has been previously trained on a dataset of 3D shapes.

19. A computer-implemented method for training a machine learning model to perform three-dimensional (3D) shape generation, the computer-implemented method comprising:

generating a set of shape embeddings associated with a 3D object;

generating semantic features associated with a two-dimensional (2D) rendering of the 3D object;

generating a set of masked shape embeddings by masking a portion of the set of shape embeddings;

generating, using a generative machine learning model, a plurality of predicted shape embeddings based on the masked shape embeddings and the textual semantic features associated with the 2D rendering; and calculating a masking loss function based on the predicted shape embeddings, the set of shape embeddings associated with the 3D object, and the semantic features.

20. The computer-implemented method of claim 19, wherein the masking loss function $L_{mask}$ is expressed by:

$$L_{mask} = -E_{Z,C \in D}[\log p(Z|Z^{msk}, C)],$$

where E represents an expected value, Z represents the set of shape embeddings associated with the 3D object, $Z^{msk}$ represents the set of masked shape embeddings, and C represents the semantic features.

\* \* \* \* \*